L. T. SINTZEL.
DETACHABLE AUTOMOBILE TIRE TREAD.
APPLICATION FILED OCT. 4, 1918.
1,311,720.  Patented July 29, 1919.
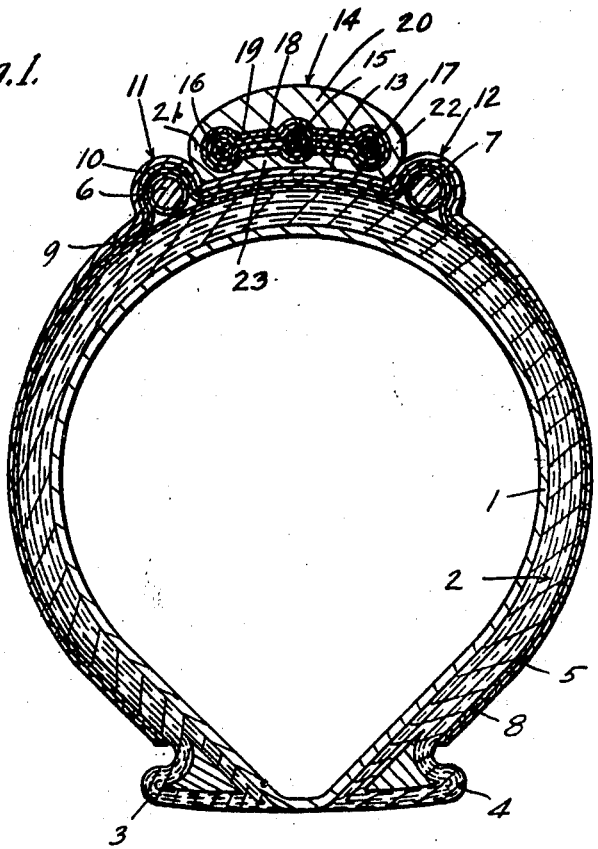
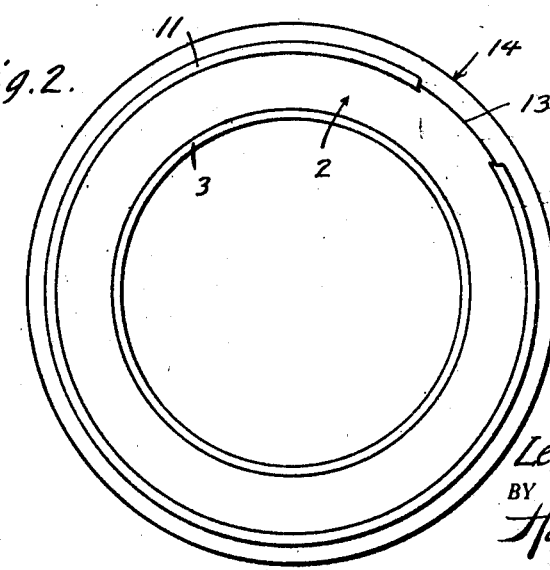
INVENTOR.
Leonard T. Sintzel.
BY Hazard & Miller
ATTORNEYS.

UNITED STATES PATENT OFFICE.

LEONARD T. SINTZEL, OF LOS ANGELES, CALIFORNIA.

DETACHABLE AUTOMOBILE-TIRE TREAD.

1,311,720.     Specification of Letters Patent.     Patented July 29, 1919.

Application filed October 4, 1918. Serial No. 256,821.

*To all whom it may concern:*

Be it known that I, LEONARD T. SINTZEL, a citizen of the United States, residing at Los Angeles, in the county of Los Angeles and State of California, have invented new and useful Improvements in Detachable Automobile-Tire Treads, of which the following is a specification.

My invention relates to an inflatable tire casing and more particularly to a tire casing provided with a removable and renewable tire-tread.

An object of my invention is to provide a casing for pneumatic tires and the like having a removable tread portion which may easily be removed from the tire and replaced by a new one.

Another object is to provide a tire having a special protection against punctures.

With these and other objects in view my invention consists in the construction and combination of parts as hereinafter shown, described and claimed.

In the accompanying drawings,

Figure 1 is a transverse section through the tire showing the position of the inner tube and the construction of the casing, together with the removable tread.

Fig. 2 is a reduced view, in side elevation, of the tire with a part of one of the retaining beads broken away showing the meeting line between the removable tread and the tire casing.

Referring to the several figures more particularly 1 is an inner tube within a casing 2 of the usual form having reinforced rim beads 3 and 4, which extend around its inner circumference. A canvas covering 5 is cemented around the sides and over the tread from bead 3 to bead 4. Two thick non-elastic cords 6 and 7 are fixed to this canvas covering around the tire on each side of the middle line of the tread parallel thereto and equally distant therefrom. A second covering 8 of canvas is cemented over the first and over the parallel cores 5 and 6. A third reinforcing covering 9 of canvas is cemented to the second over the tread portion and the parallel cores part way down the sides of the casing. A layer of rubber 10 is then spread over the reinforcing layer of canvas. This construction produces two parallel beads 11 and 12 running longitudinally around the tire with a tread groove 13 between them in which the removable tread 14 normally is seated. The removable tread is preferably formed of a middle cable 15 of twisted wire running around the middle line of the tread, two similar side cables 16 and 17 parallel to said middle cable and equally distant therefrom. Two thicknesses of canvas 18 and 19 are wrapped around the cables over and through the ring formed by them so as to hold them together in proper spaced relation to each other and finally a heavy covering of rubber is laid over the core formed by the rings and canvas wrapping. A relatively thick section 20 is laid on the outer part of the ring and a relatively thin covering around the sides 21 and 22 and inner part 23 of the ring.

It is evident that a removable tire thus formed will be fairly flexible and at the same time non-stretchable as to its circumference and would be firmly held in its groove by the beads 11 and 12.

The operation of mounting or removing the tread is simply to deflate the inner tube and collapse the casing by force sufficiently to permit the mounting or removal of the tread.

While I have shown the preferred construction of my tire casing and removable tread as now known to me, it will be understood that various changes in construction and arrangement of parts may be made by those skilled in the art without departing from the spirit of my invention as claimed.

I claim:

1. In a pneumatic tire casing a removable tread comprising, a middle cable of wire, two side cables one on each side of the middle cable, canvas wrapped around the cables, and a covering of rubber applied to the canvas.

2. In a pneumatic tire casing a removable tread comprising, a middle cable of twisted wire running around the middle line of the tread, two similar side cables parallel to the middle cable and equally distant therefrom, two thicknesses of canvas wrapped around the cables, and a heavy covering of rubber applied to the canvas and vulcanized, the rubber being relatively thick at the outer side.

In testimony whereof I have signed my name to this specification.

LEONARD T. SINTZEL.